US010150041B2

(12) United States Patent
Ventrice et al.

(10) Patent No.: US 10,150,041 B2
(45) Date of Patent: Dec. 11, 2018

(54) GAMIFICATION NETWORK ADMINISTRATION BETWEEN VARIOUS ADMINISTRATORS AND SHARING CONTENT THEREOF

(71) Applicant: Callidus Software, Inc., Dublin, CA (US)

(72) Inventors: Anthony J. Ventrice, Loma Mar, CA (US); Stephen A. Sims, Foster City, CA (US)

(73) Assignee: Callidus Software, Inc., Dublin, CA (US)

( * ) Notice: Subject to any disclaimer, the term of this patent is extended or adjusted under 35 U.S.C. 154(b) by 119 days.

(21) Appl. No.: 14/985,880

(22) Filed: Dec. 31, 2015

(65) Prior Publication Data

US 2017/0189813 A1    Jul. 6, 2017

(51) Int. Cl.
*G06F 15/16*    (2006.01)
*A63F 13/79*    (2014.01)
*A63F 13/35*    (2014.01)
*A63F 13/46*    (2014.01)

(52) U.S. Cl.
CPC .............. *A63F 13/79* (2014.09); *A63F 13/35* (2014.09); *A63F 13/46* (2014.09)

(58) Field of Classification Search
CPC ....................................................... A63F 13/79
See application file for complete search history.

(56) References Cited

U.S. PATENT DOCUMENTS

| 2015/0087407 | A1* | 3/2015 | Hate .................... G07F 17/3255 463/25 |
| 2016/0082348 | A1* | 3/2016 | Kehoe .................. G06Q 10/101 463/31 |
| 2016/0089606 | A1* | 3/2016 | Javed Lal Mohammed Ameerjan ............... G06F 3/048 463/29 |

* cited by examiner

*Primary Examiner* — Viet D Vu

(57) ABSTRACT

The present application describes methods and systems for administration of a gamification system. Administrators can be separated into tiers, each with differing levels of control. Embodiments of the present disclosure include a system that receives, from an administrator, a request to generate a second gamification site and to copy content from a first gamification site to a second gamification site. The system then determines if the administrator is enabled to do so. If the administrator has the appropriate permission, the second gamification site may be generated, and the content from the first gamification site may be copied to the second gamification site.

12 Claims, 10 Drawing Sheets

GAMIFICATION NETWORK ADMINISTRATION BETWEEN VARIOUS ADMINISTRATORS AND SHARING CONTENT THEREOF

BACKGROUND

To improve efficiency, productivity, and engagement of users many organizations have turned to gamification techniques. Gamification uses game-design elements and game principles in traditionally non-game contexts, such is in employee training and productivity. Gamification strategies can be applied in many contexts, such as health care, financial services, physical exercise, transportation, government, employee training, and the like. Gamification techniques can include providing rewards to players who achieve a benchmark or accomplish a task. Further, rewards can be used to foster competition between players to improve engagement.

BRIEF DESCRIPTION OF THE DRAWINGS

The following description is set forth with reference to the accompanying figures. In the figures, the left-most digit(s) of a reference number identifies the figure in which the reference number first appears. The use of the same reference numbers in different figures indicates similar or identical items.

DESCRIPTION OF THE FIGURES

Figure 1:
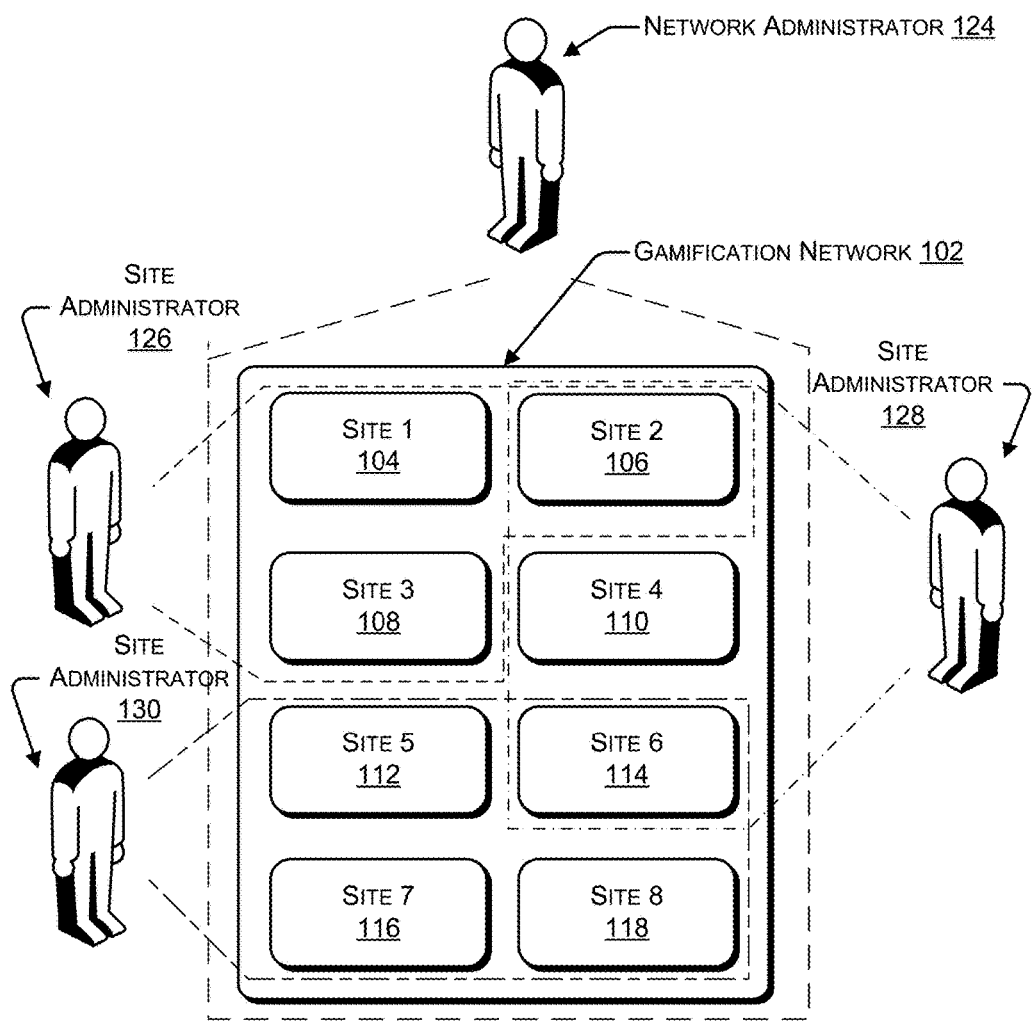
FIG. 1 illustrates an example gamification network that utilizes network administration across gamification sites.

Embodiments of the present disclosure include a platform that allows for administration of a gamification system in which administrators to have varying levels of control over the content of a specific gamification site, a subset of the gamification sites within a network, and/or the entire network(s). In various embodiments, administrators can be separated into tiers, each with differing levels of control.

Gamification systems are designed to leverage a user's desire for socializing, learning, achieving, status, and competition. Gamification systems according to embodiments generally include a number of gamification "sites" which are systems designed to encourage a group of users to achieve a specific goal or a set of related goals. Gamification sites may contain content including goals (e.g., watch a video, answer questions, sell an amount of a product, complete a homework assignment, run a distance, etc.), rewards (e.g., badges, points, levels, recognitions etc.), visualizations (e.g., the look and feel of the site, the look of the rewards, the information shown to the user about their progress or the progress of other users, etc.), and milestone logic (e.g., number of points required to achieve a level, number of points required to earn a badge, number of badges required to achieve a level, etc.). Content can also include design elements that direct the look and feel of the site. In some embodiments, a user's milestones or rewards are visible to other users, for example, on a leader board.

Sites can be organized into "network(s)." For example, a network may include all of the sites managed by an organization. In other embodiments, a network may include all of the sites managed by a department of an organization.

For example, a first administrator may create a site with content, which a second administrator wishes to use. In some embodiments, the first administrator may have the option of providing other administrators permission to share content (i.e., edit and contribute to the content), read content (i.e., view and use the content), to copy the content, or to block other administrators from viewing or in any way using the content. In some embodiments, an administrator may have read permissions, but is able to send a request to the owner of a site's content to modify the content. In embodiments where the second administrator may be able to copy the content from the site in order to create a second site, the second administrator may then be able to edit or otherwise modify the content. In specific embodiments, only the originating administrator (e.g., the first administrator) may have permission to edit or otherwise modify shared content. In some embodiments, more than one administrator may be able to edit or otherwise modify shared content.

In the event an administrator wishes to modify the content of a site, the modified content may be accessed by all sites that have share, read, or copy access to the original content. In some embodiments, the administrators who control the sites with shared, read, or copied content may be given the option to update their site. In some embodiments, the originating administrator or the administrators who control the sites with shared or read content may be given the option to have updates be pushed to sites with shared content or have updates be pulled to such sites.

The ability to share or read content across sites also allows administrators to set up gamification elements and/or goals that involve interaction with more than one site. For example, an organization may have a first site which tracks goals related to training and a second site which tracks goals related to sales. In this example, a user may have a goal that requires them to achieve a certain level or number of points on each of the sites. Upon achieving the level or number of points on each site, the user may be awarded a badge, which is then displayed on both sites. In this example, each of the sites may be controlled or "owned" by a different administrator. In some embodiments, this can be achieved if one site shares content with another site, allowing both site administrators to edit and contribute to the content. In some embodiments, this can be achieved if a network administrator creates the badge. Further, a user may be able to track their progress toward a goal on one site and it will automatically update their progress on the other site.

As illustrated in FIG. 1, a gamification network 102 can include multiple gamification sites 104-118. In various embodiments, there can be a network administrator 124 and one or more site administrators 126-130. In some embodiments, there can be multiple network administrators. As shown using the dotted lines, site administrator 126 controls "site 1" 104, and "site 3" 108, and shares control of "site 2" 106 with site administrator 128; site administrator 128 controls "site 4" 110, shares control of "site 2" 106 with site administrator 126, and shares control of "site 6" 114 with site administrator 130; and site administrator 130 shares control of "site 6" 114 with site administrator 128, and also controls "site 5" 112, "site 7" 116, and "site 8" 118.

Figure 2:
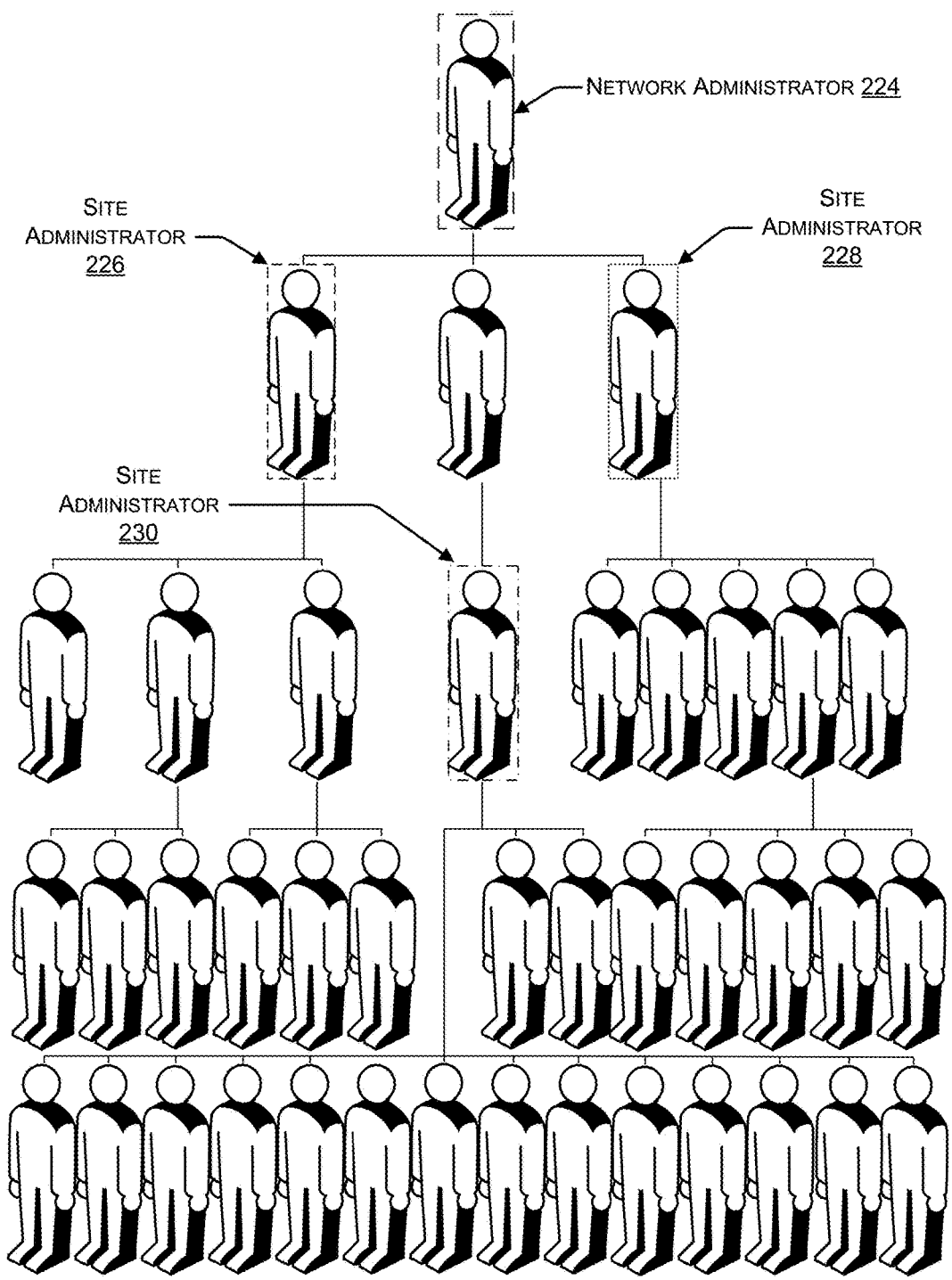
FIG. 2 illustrates an example organization chart for an organization that uses a gamification system.

FIG. 2 shows an organizational chart for an illustrative organization that utilizes a gamification network. A network administrator 224 and site administrators 226-230 are marked using dotted lines.

Figure 3:
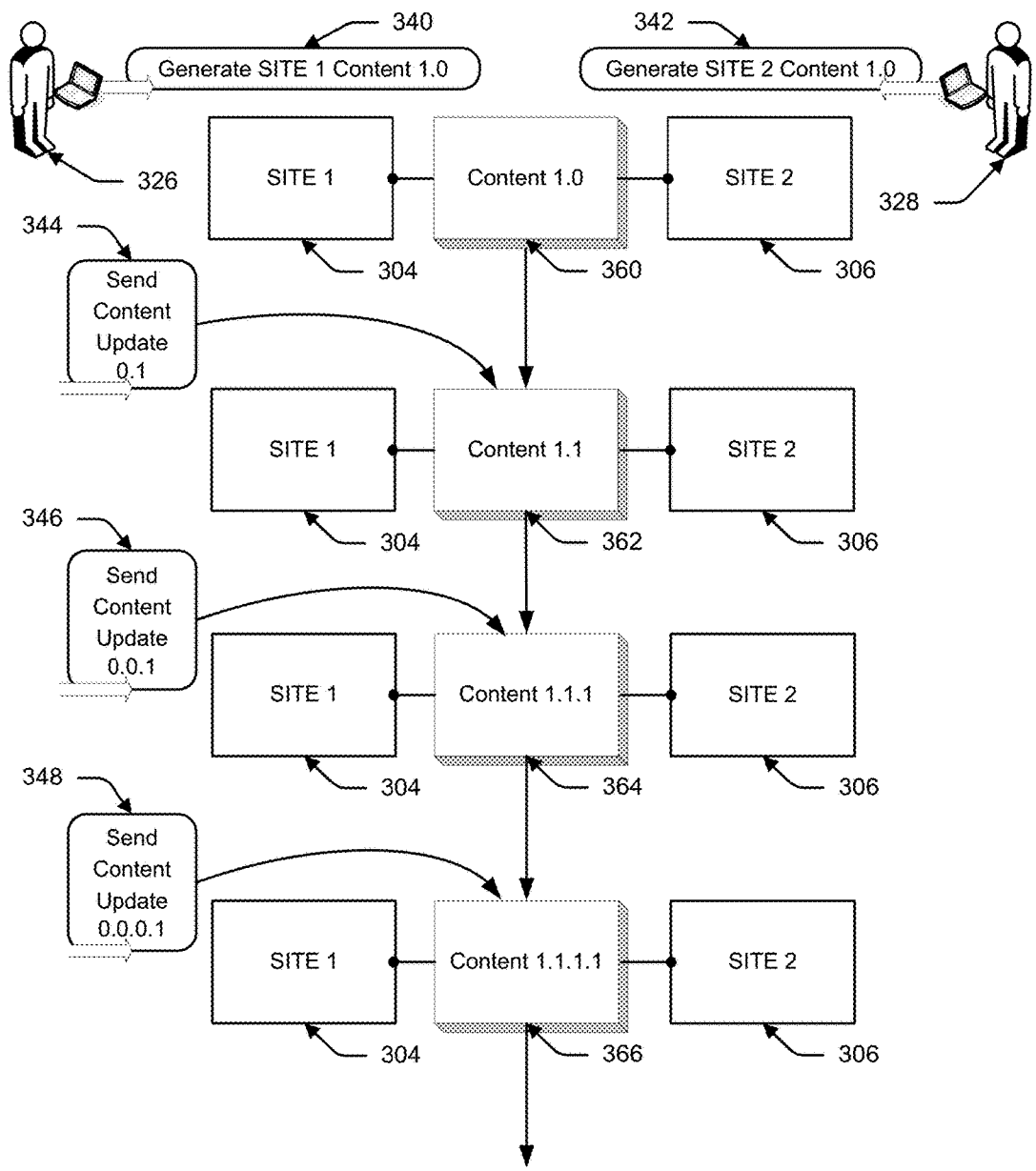
FIG. 3 illustrates a subset of gamification sites in an example gamification network.

FIG. 3 illustrates an exemplary relationship between two gamification sites 304 and 306. In this example, site administrator 326 sends a request 340 to generate a site that contains "content 1.0" 360. "Site 1" 304 is then created. In some embodiments, site administrator 326 created "content 1.0" 360. In a further embodiment, site administrator 328 created "content 1.0" 360. In other embodiments, another site administrator created "content 1.0" 360. Site administrator 328 then sends a request 342 to generate a site that reads "content 1.0" 360 from "site 1" 304. "Site 2" 306 is then created. Site administrator 326 then pushes "content update 0.1" 344, which is integrated into "content 1.0" 360, used by "site 1" 304 and "site 2" 306, resulting in "site 1" 304 and "site 2" 306 using "content 1.1" 362. In embodiments, a notification may be sent to site administrator 328 that "content update 0.1" 344 has been sent. Site administrator 326 can push "content update 0.0.1" 346, which is then integrated into "content 1.1" 362, resulting in "content 1.1.1" 364. In embodiments, a notification may be sent to site administrator 328 that "content update 0.0.1" has been sent. In some embodiments, site administrator 326 can push "content update 0.0.0.1" 348, which is then integrated into "content 1.1.1" 364, resulting in "content 1.1.1.1" 366, used by "site 1" 304 and "site 2" 306. In embodiments, a notification may be sent to site administrator 328 that "content update 0.0.0.1" has been sent.

Figure 4:
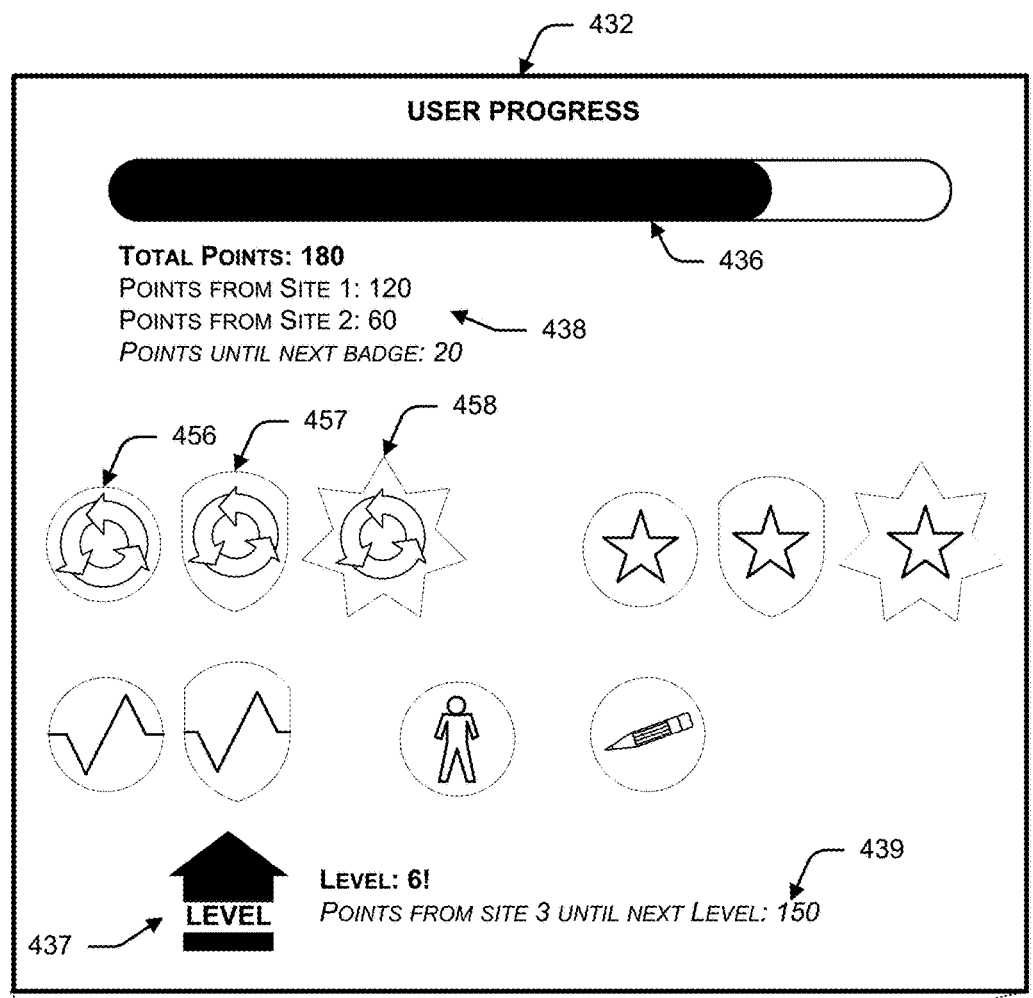
FIG. 4 illustrates an example of a user progress page of a gamification network.
Figure 4:
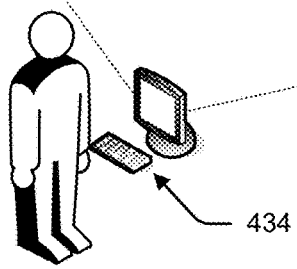

FIG. 4 illustrates another embodiment of the disclosure. In this example, a user 434, uses at least three gamification sites, "site 1," "site 2," and "site 3." In embodiments, "site 1" and "site 2" share content, which allows for a user to earn points in either site that can be used to achieve badges. In other embodiments, "site 1" may read content from "site 2," such that only the site administrator of "site 2" may award points. In some embodiments, badges may treat points from either site as interchangeable. In other embodiments, badges may require a certain number of points from "site 1" and a certain number of points from "site 2." In some embodiments, the points earned on "site 1" and "site 2" may be given different weights, such that the points earned on "site 1" may be worth twice as much as the points earned on "site 2," or vice versa.

User progress page 432 can display the user progress for user 434. In some embodiments, a user progress page could also be a leaderboard. In such embodiments, progress of a user population or a subset of a user population could also be shown.

In this example, the user's progress toward the next badge is shown in a progress bar 436. In addition to the progress bar, a summary of the user's progress is also shown 438. As shown, the user has earned 120 points on "site 1" and 60 points on "site 2" for a total of 180 points. Ten illustrative badges are shown. In some embodiments, badge 456 indicates a lower-level badge, which may be earned by collecting 25 points, for example. In such an example, 457 indicates a mid-level badge, which may be earned by collecting 50 points, and 458 indicates a higher-level badge which may be earned by collecting 100 points, for example.

In this example, "site 3" has copied a portion of the content from "site 1," such that a user is awarded points in "site 3." In such an example, although points are earned in "site 3," they are not co-mingled to the points earned in "site 1" or "site 2," and therefore cannot be used to earn badges. Instead, the points in "site 3" are collected for the purpose of increasing a user's level. As shown, the user 434 has "leveled-up" (i.e., increased their level) 437 to level 6. In order to level-up again, the user needs to earn 150 more points in "site 3", as shown in the progress summary 439.

In other examples, "site 3" may award points to a user for their action and the points may be collected in order to earn badges. In such examples, the badges may be separate from and different than the badges awarded by "site 1" or "site 2." In further examples, the points earned in "site 3," may be used to earn the same badges as "site 1" and in "site 3." In such examples, the total points shown in 438 would include the points earned in "site 3."

Figure 5:
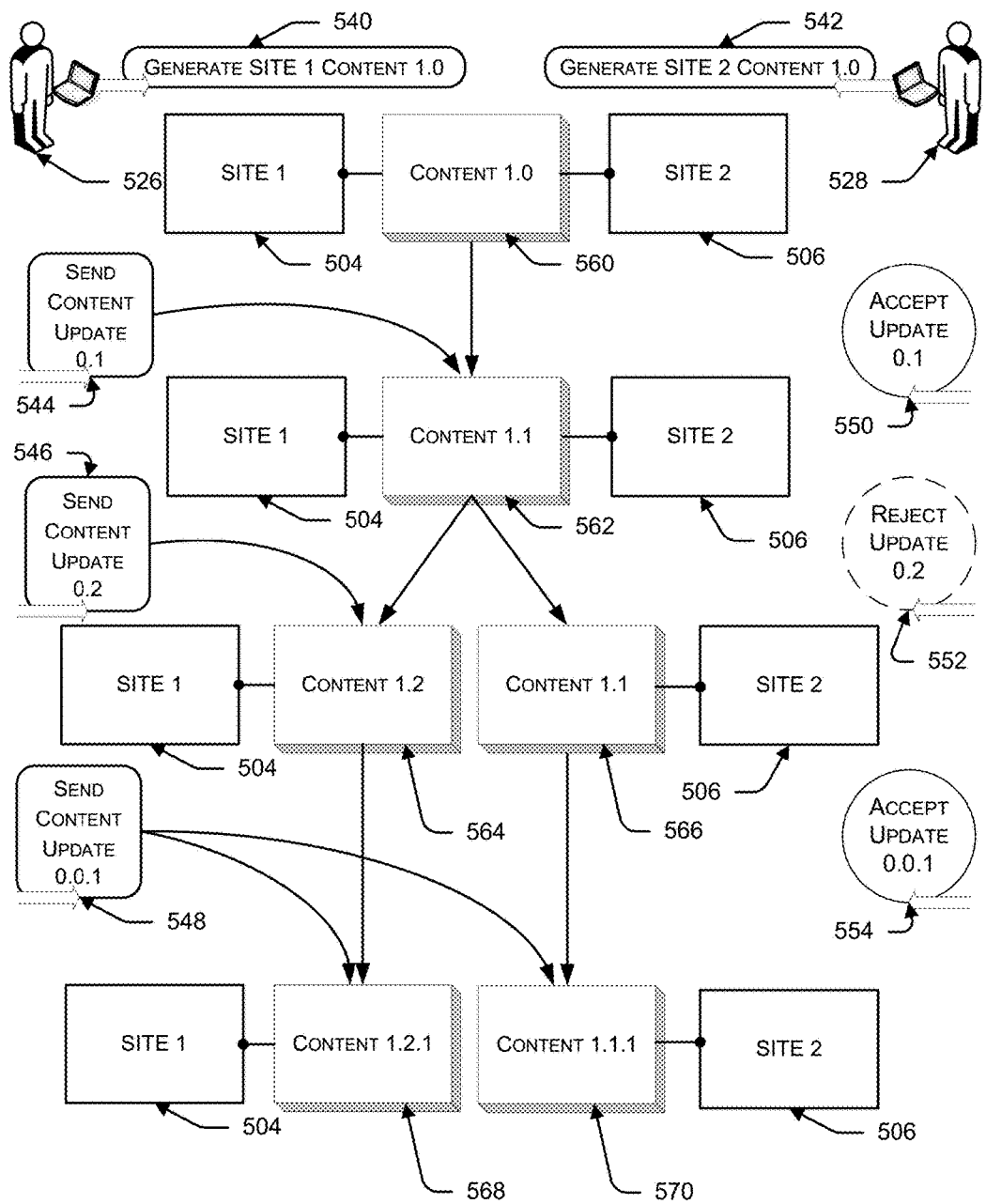
FIG. 5 illustrates a subset of gamification sites in an example gamification network.

FIG. 5 illustrates another embodiment of the disclosure. In this example, site administrator 526 sends a request 540 to generate "site 1" using "content 1.0" 560. "Site 1" 504 is then generated. A second site administrator 528 then sends a request 542 to generate "site 2" using "content 1.0" 560, shared with "site 1" 504. "Site 2" 506 is then generated using "content 1.0" 560. In embodiments, site administrator 526 can send "content update 0.1" 544. In some embodiments, a notification may be sent to site administrator 528 indicating that "content update 0.1" has been sent. In some embodiments, site administrator 528 may be given the option to accept or reject the content update. After sending an instruction to accept "content update 0.1" 550, the updated content is integrated into "content 1.0" 560, used by "site 2" 506, to produce "content 1.1" 562. In some embodiments, the content update may be integrated into a copy of "content 1.0," used by "site 1" 504, before site administrator 528 has responded to the notification. In other embodiments, the content update may be integrated into "content 1.0" 560, used by "site 1" 504 and "site 2" 506, after a response is received from site administrator 528.

Site administrator 526 can then send "content update 0.2" 546. In embodiments, a notification may be sent to site administrator 528 that the "content update 0.2" 546 has been sent. In some embodiments, site administrator 528 may be given the option to accept or reject the content update. After sending an instruction to reject "content update 0.2" 552, the updated content is not integrated into "content 1.1" 562 used by "site 2" 506. In some embodiments, the content of "site 1" 504 ("content 1.1" 562) that may be shared with "site 2" 506 may be copied to create "content 1.1" 566 such that "content 1.1" 566 is a separate copy of "content 1.1" than "content 1.1" 562 in which "content update 0.2" is integrated, resulting in "content 1.2" 564. In other embodiments, a copy of "content 1.1" 566 may have already been made, either at the time of the creation of "site 2" or at any point later in this process.

In some embodiments, after site administrator 528 sends an instruction to reject "content update 0.2" 552, site administrator 526 may send "content update 0.0.1" 548. In some embodiments, site administrator 528 may then be given the option to accept or reject the content update. In particular embodiments, site administrator 528 may send a response accepting the content update 554, and "content update 0.0.1" may be integrated into "content 1.1" 566 to create "content 1.1.1" 570, used by "site 2" 506. In some embodiments, the content update may be integrated into "content 1.2" 564, used by "site 1" 504, resulting in "content 1.2.1" 568 before site administrator 528 has responded to the notification. In other embodiments, the content update may be integrated into "content 1.2" 564, used by "site 1" 504, after a response is received from site administrator 528. In other embodiments, site administrator 528 may not be notified of further content updates sent by site administrator 526 after a content update has been rejected.

Figure 6:
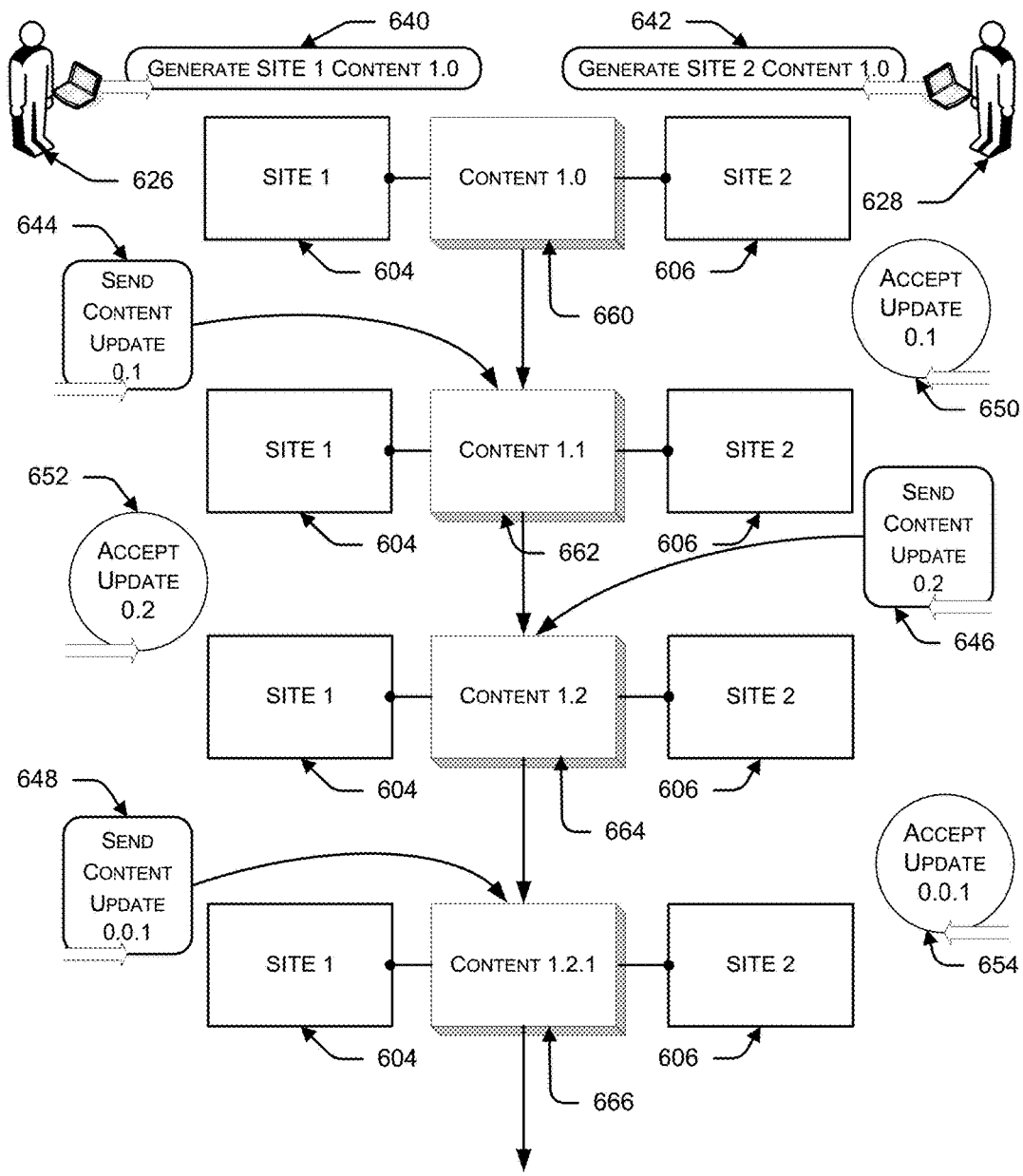
FIG. 6 illustrates a subset of gamification sites in an example gamification network.

FIG. 6 illustrates another embodiment of the disclosure. In this example, site administrator 626 sends a request 640 to generate "site 1" using "content 1.0" 660. "Site 1" 604 is then generated. A second site administrator 628 then sends a request 642 to generate "site 2" using "content 1.0" 660, which is shared with "site 1" 604. "Site 2" 606 is then generated using "content 1.0" 660. Site administrator 626 can send "content update 0.1" 644. In embodiments, a notification may be sent to site administrator 628 that "content update 0.1" has been sent. In some embodiments, site administrator 628 may be given the option to accept or reject the content update. After sending an instruction to accept "content update 0.1" 650, the updated content is integrated into "content 1.0" 660, resulting in "content 1.1" 662. In some embodiments, the content update may be integrated into "content 1.0" 660 after a pre-determined period of time, but before site administrator 628 has responded to the notification. In other embodiments, the content update may be integrated into "content 1.0" 660 after a response is received from site administrator 628.

Site administrator 628 can then send a "content update 0.2" 646. In embodiments, a notification may be sent to site administrator 626 that "content update 0.2" has been sent. In some embodiments, site administrator 626 may be given the option to accept or reject the content update. After site administrator 626 sends an instruction to accept "content update 0.2" 652, the updated content is integrated into "content 1.1" 662, resulting in "content 1.2" 664.

Site administrator 626 can then send "content update 0.0.1" 648. In embodiments, a notification may be sent to site administrator 628 that the "content update 0.0.1" has been sent. In some embodiments, site administrator 628 may be given the option to accept or reject the content update. After site administrator 628 sends an instruction to accept "content update 0.0.1" 654, the updated content is integrated into "content 1.2" 664, resulting in "content 1.2.1" 666.

In other embodiments, site administrator 628 may not be notified of further content updates sent by site administrator 626. In some embodiments, the content update may be integrated into "content 1.2" 664, resulting in "content 1.2.1" 666, before site administrator 628 has responded to the notification. In other embodiments, the content update may be integrated into "content 1.2" 664, resulting in "content 1.2.1" 666, after a response is received from site administrator 628.

Figure 7:
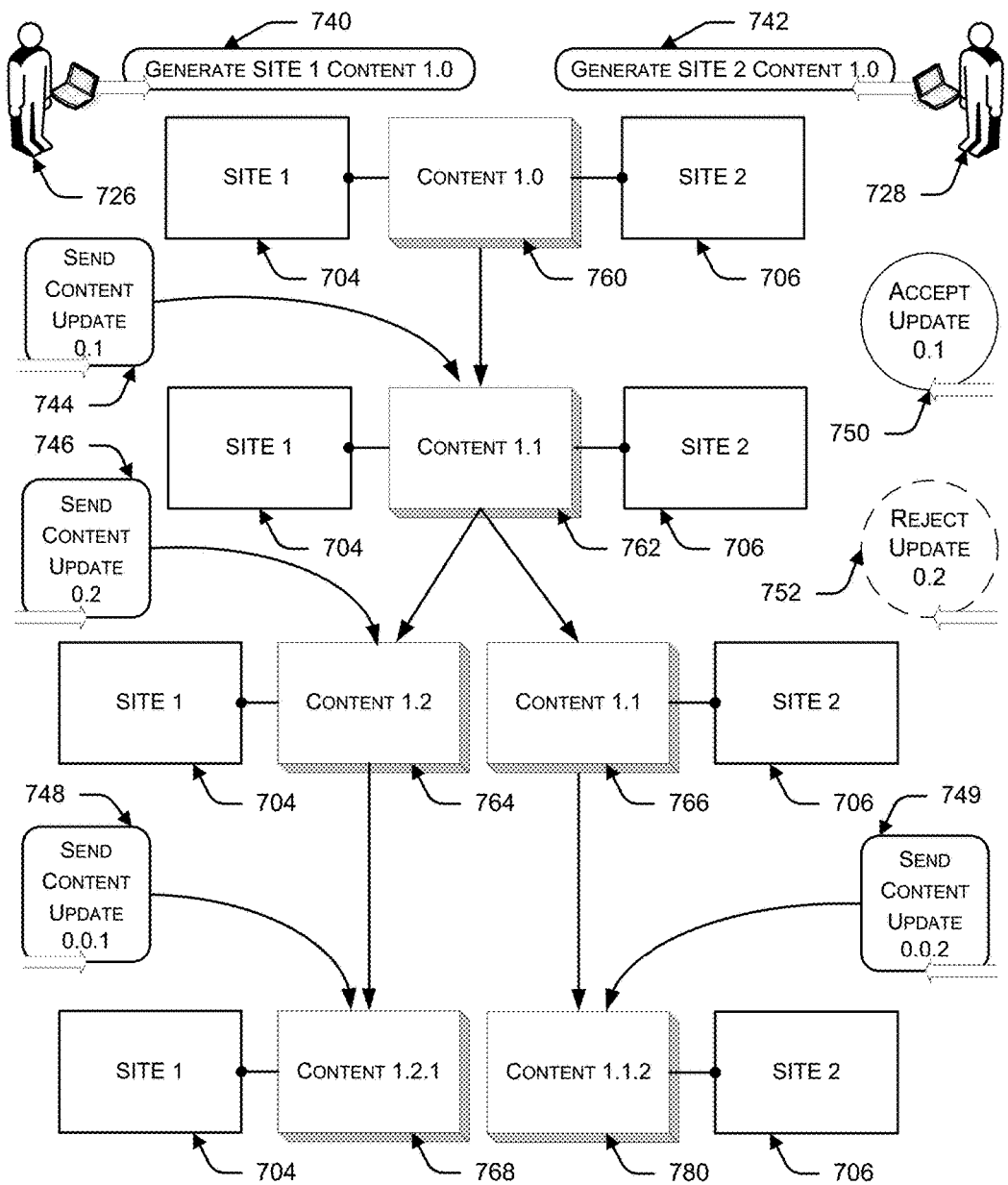
FIG. 7 illustrates a subset of gamification sites in an example gamification network.

FIG. 7 illustrates a further embodiment of the disclosure. In this example, site administrator 726 sends a request 740 to generate "site 1" using "content 1.0" 760. "Site 1" 704 is then generated. A second site administrator 728 then sends a request 742 to generate "site 2" using "content 1.0" 760 which is shared with "site 1" 704. "Site 2" 706 is then generated using "content 1.0" 760 shared from "site 1" 704. Site administrator 726 can send "content update 0.1" 744. In embodiments, a notification may be sent to site administrator 728 that "content update 0.1" has been sent. In some embodiments, site administrator 728 may be given the option to accept or reject the content update. After sending an instruction to accept "content update 0.1" 750, the updated content is integrated into "site 2" 706. In some embodiments, the content update may be integrated into "content 1.0" 760 to produce "content 1.1" 762 before site administrator 728 has responded to the notification. In other embodiments, the content update may be integrated into "content 1.0" 760 after a response is received from site administrator 728.

Site administrator 726 can then send "content update 0.2" 746. In embodiments, a notification may be sent to site administrator 728 that "content update 0.2" 746 has been sent. In some embodiments, site administrator 728 may be given the option to accept or reject the content update. After sending an instruction to reject "content update 0.2" 752, the updated content is not integrated into the content used by "site 2" 706 ("content 1.1" 762). In some embodiments, "content 1.1" 762 may be copied in order to create a separate copy of "content 1.1" 766 to be used by "site 2" 706 before "content update 0.2" is integrated. In other embodiments, a copy the content may have already been made, either at the time of the creation of "site 2" or at any point later in this process. In some embodiments, site administrator 728 may not be notified of further content updates sent by site administrator 726.

In some embodiments, after site administrator 728 sends an instruction to reject "content update 0.2" 752, site administrator 726 may send "content update 0.0.1" 748. In some embodiments, site administrator 728 is not notified. In other embodiments, site administrator 728 may then be given the option to accept or reject the content update. The content update may be integrated into "content 1.2" 764, resulting in "content 1.2.1" 768.

Site administrator 728 can then send "content update 0.0.2" 749. In embodiments, a notification may be sent to site administrator 726 that "content update 0.0.2" has been sent. In some embodiments, site administrator 726 may be given the option to accept or reject the content update. The updated content ("content 0.0.2") is integrated into "content 1.1" 766, resulting in "content 1.1.2" 780.

Figure 8:
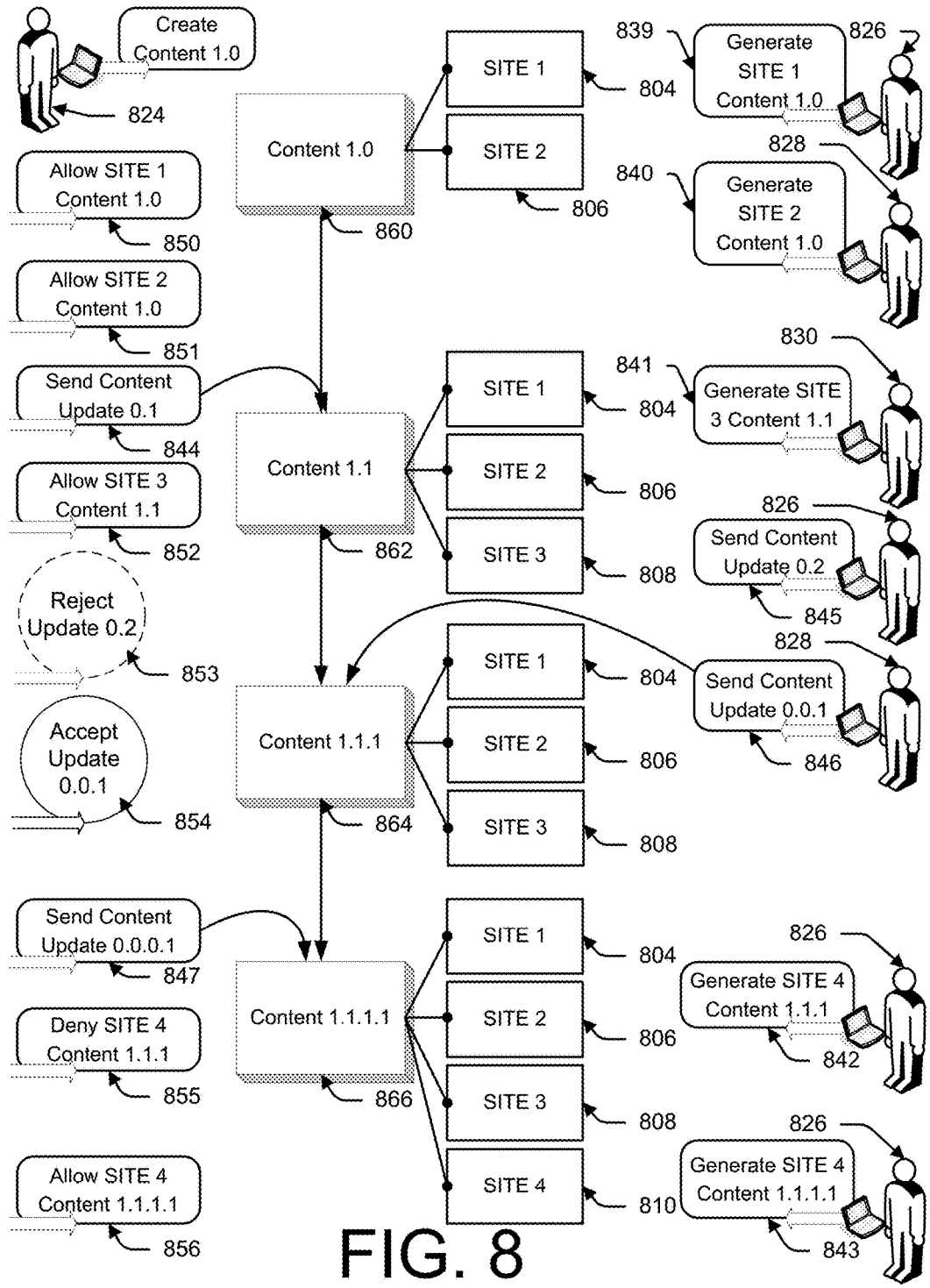
FIG. 8 illustrates an example gamification network.

FIG. 8 illustrates a further embodiment of the disclosure. In this example, network administrator 824 creates "content 1.0" 860. A site administrator 826, then sends a request to generate "site 1" using "content 1.0" 839. The network administrator 824 then approves this request 850, and "site 1" 804 is generated. In some embodiments, the network administrator 824 does not have to approve a request to generate a site. In other embodiments, a network administrator does not have to approve requests from a subset of site administrators, but does have to approve requests from other site administrators. In some embodiments, the network administrator can specify a site administrators permission level (e.g., read only) at the time that the request to generate a site is approved. In some embodiments, the content may include a permissions level, for example, blocking site administrator(s) from viewing, blocking site administrator(s) from editing, allowing site administrator(s) to edit with approval, or allowing site administrator(s) to edit without needing specific approval.

A second site administrator 828 can also send a request to generate a site using "content 1.0" 860. The network administrator 824 then approves this request 851, and "site 2" 806 is generated.

Network administrator 824 can send "content update 0.1" 844. In particular embodiments, content updates sent by the network administrator 824 are automatically integrated. The content update is integrated into "content 1.0" 860, resulting in "content 1.1" 862. In embodiments, a notification may be sent to site administrators 826 and/or 828 that "content update 0.1" has been sent. In some embodiments, site administrators 826 and/or 828 may be given the option to accept or reject the content update. In some embodiments, if a site administrator sends an instruction to reject a content update, the current version of the content may be copied to a separate location that can be used by the site administrator that rejected the content update. In other embodiments, a copy of the current content may have already been made, either at the time of the creation of a site or at any point later in this process. In particular embodiments, each site references a separate copy of the content.

A third site administrator 830 can send a request to generate a site using "content 1.1" 862. The network administrator 824 then approves this request 852, and "site 3" 808 is generated.

Site administrator 826 can then send "content update 0.2" 845. Network administrator 824 may then be given the option to accept or reject the content update. In other embodiments, site administrators may have permissions to push updates that are automatically integrated into the content. In still other embodiments, site administrators may have permissions that do not allow them the option to send updates to the content. After the network administrator sends an instruction to reject "content update 0.2" 853, the updated content is not integrated into "content 1.1" 862.

In some embodiments, if a network administrator sends an instruction to reject a content update, the current version of the content may be copied to a separate location that can be used by the site administrator that requested the content update. In other embodiments, a copy the current content may have already been made, either at the time of the creation of a site or at any point later in this process. In particular embodiments, each site references a separate copy of the content. In some embodiments, network administrator 824 may have the ability to change the permission level that site administrator 826 has in response to actions taken by the site administrator 826, such as sending a content update 845.

In some embodiments, after network administrator 824 rejects "content update 0.2" 853, site administrator 828 may send "content update 0.0.1" 846. In some embodiments, network administrator 824 may then be given the option to accept or reject the content update. In other embodiments, site administrator 828 may have permission to push a content update without the approval of the network administrator 824. After the network administrator 824 accepts the content update 854, the content update may be integrated into "content 1.1" 862, resulting in "content 1.1.1" 864.

Network administrator 824 can send "content update 0.0.0.1" 847. In particular embodiments, content updates sent by the network administrator 824 are automatically integrated. In embodiments, a notification may be sent to site administrators 826-830 that the "content update 0.0.0.1" has been sent. In some embodiments, site administrators 826-830 may be given the option to accept or reject the content update. In some embodiments, if a site administrator sends an instruction to reject a content update, the current version of the content may be copied to a separate location that can be used by the site administrator that rejected the content update. In other embodiments, a copy the current content may have already been made, either at the time of the creation of a site or at any point later in this process. In particular embodiments, each site references a separate copy of the content.

Site administrator 826 can send a request 842 to generate a site using "content 1.1.1" 864. The network administrator 824 then has the option to approve or deny the request. In some embodiments, if the requested content is a previous version, the network administrator 824 may deny the request 842. In other embodiments, the network administrator 826 may allow the request, however, the site may be generated with the most current content version. In still other embodiments, the network administrator 824 may conditionally approve the generation of the site, and provide the site administrator 826 with the option to create a site with the most current version of the content. The site administrator 826 may be given the option to choose the request content version or the most current content version. If the site administrator chooses to use the requested content version, the requested version of the content may be copied to a separate location that can be used by site administrator 826.

In particular embodiments, after network administrator 824 denies the request to generate "site 4" using "content 1.1.1" 864, site administrator 826 submits a second request to generate "site 4" using "content 1.1.1.1" 866. Network administrator 824 then approves the second request 843, and "site 4" 810 is generated.

Figure 9:
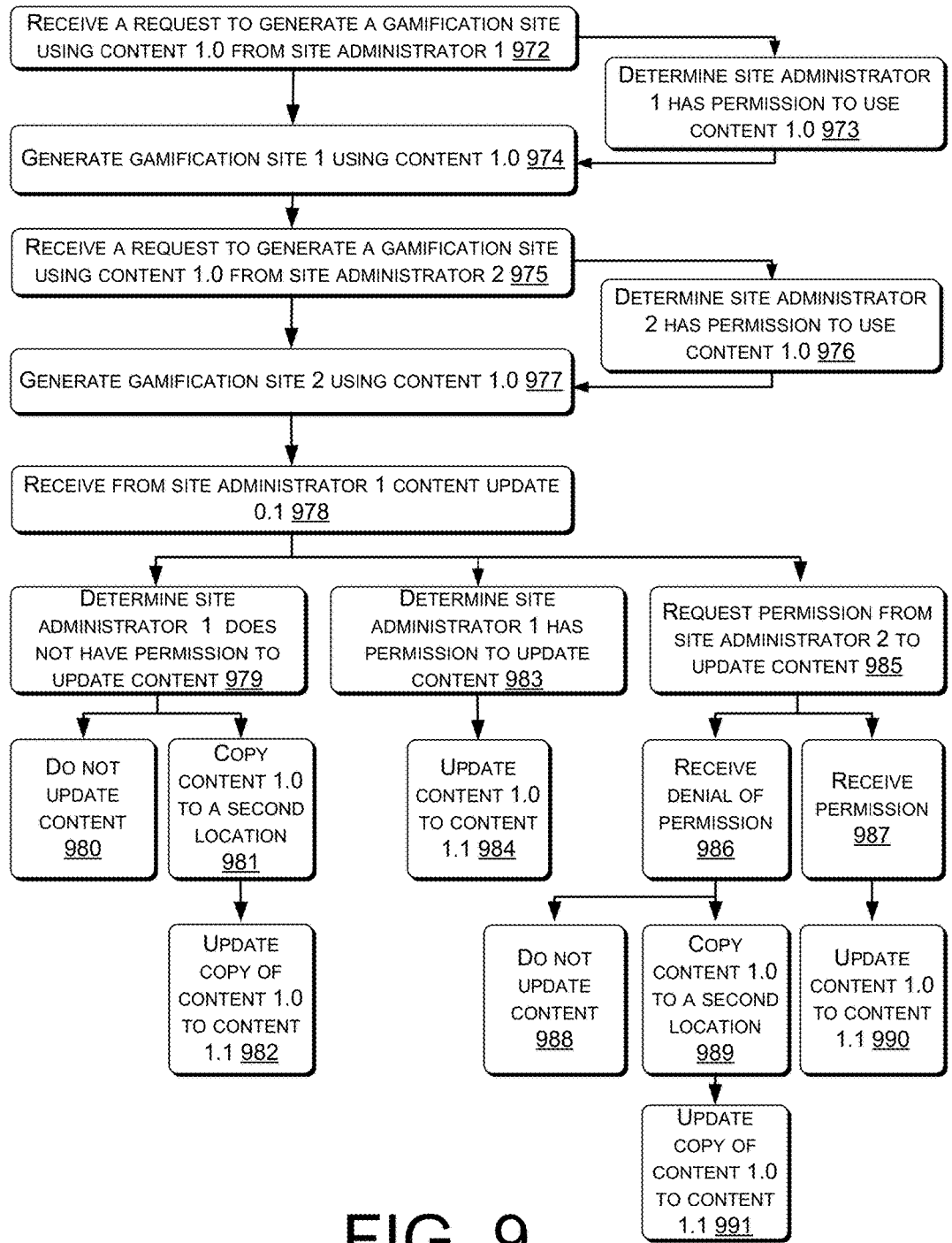
FIG. 9 illustrates an example method of the disclosure.

FIG. 9 illustrates a method of the disclosure. At 972, a request to generate a gamification site using "content 1.0" is received from "site administrator 1". In some embodiments, a permission can be associated with "content 1.0" such that any site administrator has permission to generate a gamification site using that content. In other embodiments, a permission can be associated with "content 1.0" which requires a certain level or type of permission to be associated with the site administrator. In such embodiments, after a request to generate a gamification site is made, it is determined if the requesting site administrator has the appropriate permission as seen in 973. If the site administrator is determined to have the appropriate permissions and/or if the permission associated with the content allow for it, a gamification site is then generated which uses "content 1.0," as seen in 974.

A second request to generate a gamification site using "content 1.0" may be received from a second site administrator 975. Similarly, in some embodiments, a permission can be associated with "content 1.0" such that any site administrator has permission to generate a gamification site using that content. In other embodiments, a permission can be associated with "content 1.0" which requires a certain level or type of permission to be associated with the site administrator. In such embodiments, after a request to generate a gamification site is made, it is determined if the requesting site administrator has the appropriate permission as seen in 976. If the site administrator is determined to have the appropriate permissions and/or if the permission associated with the content allow for it, a gamification site is then generated which uses "content 1.0," as seen in 977.

A "content update 0.1" can be submitted by a site administrator, 978. At this point, it can be determined that the site administrator has permission to update "content 1.0" 983. If this is the case, then "content 1.0" can be updated with "content update 0.1," resulting in "content 1.1" 984. In other embodiments, it is determined that the site administrator does not have permission to update "content 1.0" 979. In some embodiments, the content update may be denied and the content will not be updated 980. A notification alerting "site administrator 1" that the content will not be updated may be sent. In further embodiments, a copy of "content 1.0" may be made in a second location 981. "Content update 1.0" may then be integrated into the copy of "content 1.0" 982.

Further, the permissions associated with "content 1.0," with the site administrator(s), and/or with the site(s) may require that at least one site administrator, in this case "site administrator 2," provide permission before "content 1.0" is updated 985. If "site administrator 2" denies the request for permission to update "content 1.0" with "content update 0.1" 986, the content may not be updated 988. A notification alerting "site administrator 1" that the content will not be updated may be sent. In other embodiments, a copy of "content 1.0" may be made in a second location 989. "Content update 0.1" may then be integrated into the copy of "content 1.0" 991. If "site administrator 2" grants permission to update "content 1.0" with "content update 0.1" 987, "content update 0.1" is integrated into "content 1.0," resulting in "content 1.1" 990.

Figure 10:
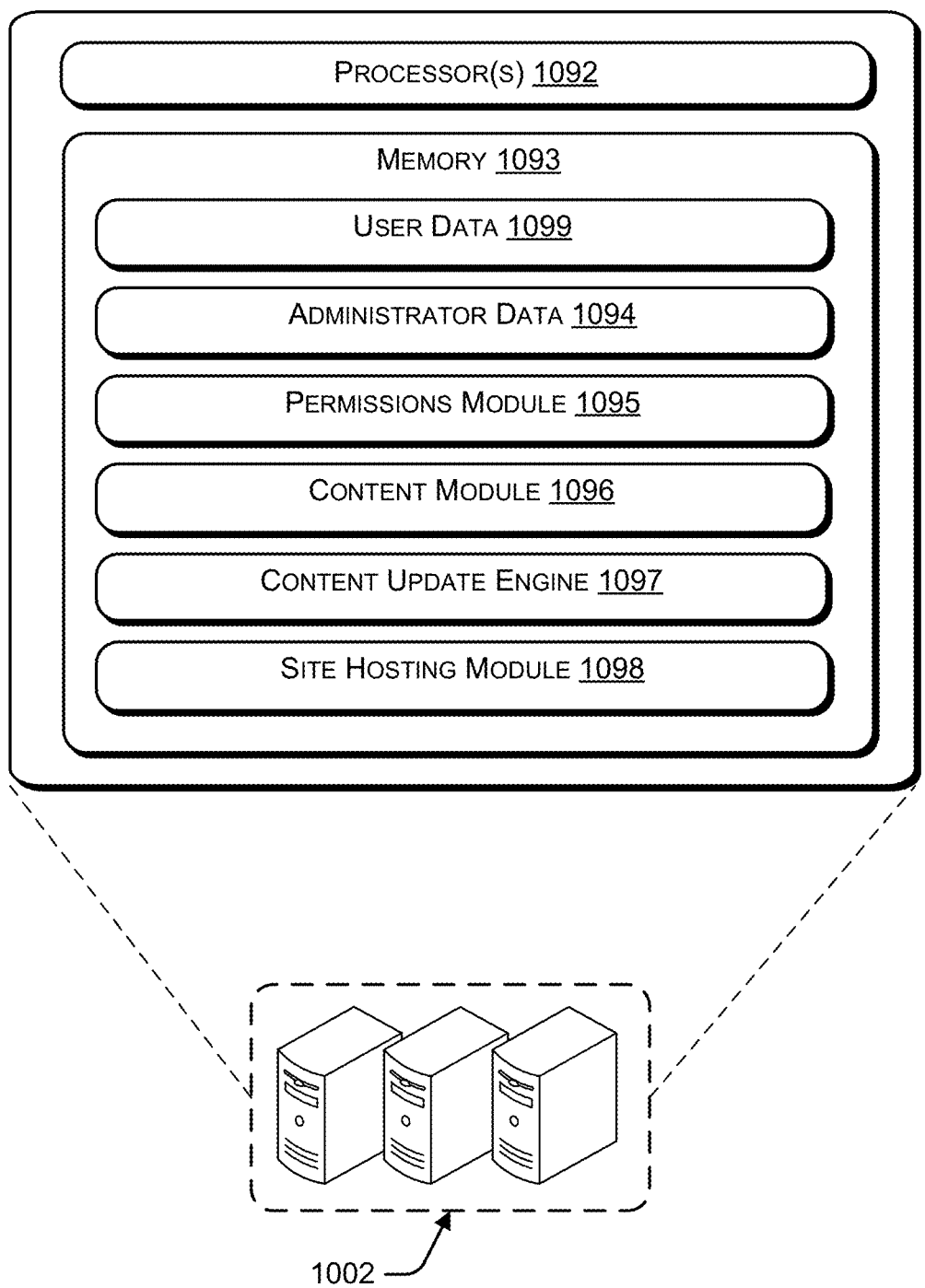
FIG. 10 is a block diagram of an example computing system usable to provide the gamification site platform.

FIG. 10 is a block diagram of an example computing system usable to provide the gamification site platform described herein. The gamification site platform 1002 may be configured as any suitable computing device or computing devices capable of hosting gamification sites. Suitable computing devices may include or be part of personal computers (PCs), servers, server farms, datacenters, special purpose computers, combinations of these, or any other computing device(s).

In some embodiments, the gamification site platform 1002 includes processor(s) 1092. The processor(s) 1092 are central processing unit(s) (CPU) or other processing unit(s). Individual ones of the processor(s) 1092 may include a circuit device having transistor circuits arranged in semiconductor substrate to perform arithmetic, logical, and/or input/output (I/O) operations, and configured to execute these operations according to an instruction set, such that the instruction set defines machine codes (e.g., operational codes) that cause the transistor circuits to perform various ones of the operations responsive to the associated machine codes being copied to an instruction register(s) of the processor(s) 1092.

In various embodiments, the processor(s) 1092 are further communicatively coupled to memory 1093. Memory 1093 can include volatile and nonvolatile, removable and non-removable media implemented in any method or technology for storage of information, such as computer readable instructions, data structures, program modules, or other data. Depending on the configuration and type of computing device used, memory 1093 may include volatile memory (such as random access memory (RAM)) and/or non-volatile memory (such as read-only memory (ROM), flash memory, etc.). Generally, memory 1093 includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). Memory 1093 may also include additional removable storage and/or non-removable storage including, flash memory, magnetic storage, optical storage, and/or tape storage that may provide non-volatile storage of computer-readable instructions, data structures, program modules, and other data.

Memory 1093 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Communication media may embody computer-readable instructions, data structures, program modules, or other data in a modulated data signal, such as a carrier wave, or other transmission mechanism. As used herein, computer storage media does not include communication media.

The memory 1093 stores data 1094 and 1099, and modules 1095-1098. Memory 1093 may store program instructions that are loadable and executable on the processor(s) 1092, as well as data generated during execution of, and/or usable in conjunction with, these programs. For example, the memory 1093 includes the user data 1099, administrator data 1094, permission module 1095, content module 1096, content update engine 1097, and site hosting module 1098.

In various embodiments, the memory 1093 stores user data 1099. In such embodiments, user data 1099 may include identifying user data, such as a username, an anonymized tag, etc.; and user progress data, such as interactions with the gamification site, tasks completed, rewards earned, tasks that remain uncompleted, and the like.

In various embodiments, the memory 1093 stores administrator data 1094. In such embodiments, administrator data 1094 can include identifying information about an administrator (e.g. username, authentication credentials, and the like) and a designation of the administrator's role (e.g., network administrator and/or site administrator). In some embodiments, the designation as a network administrator or a site administrator is not mutually exclusive, in other words, an administrator could be designated as a network administrator with regard to one network, and a site administrator of a site in the same network, or a different network. In some embodiments, there may be one or more network administrators for a given network. In some embodiments, there may be one or more site administrators for a given site.

In embodiments, administrators may be separated into levels or another tier system. In such embodiments, the designation of "network" or "site" administrator may also be used. Administrator data 1094 can also include data regarding the administrator's association with a particular site or network. Such data can indicate that an administrator will be contacted in the event another administrator wishes to update content related to a site, and the like.

In some embodiments, one or more permissions related to the administrator can be stored in administrator data 1094. The one or more permissions can be related to viewing content, viewing a site, creating content, creating a site, copying content, sharing content, sending content updates, allowing or denying permission to update content, and the like. The one or more permissions can be related to the designation of the administrator, a level associated with the administrator, a tier associated with the administrator, or the one or more permissions can be set independent of the administrator's status.

In embodiments, a permissions module 1095 that is programmed to be operated by the processor(s) 1092 may be present. The permissions module 1095 may comprise any number of sub-modules, applications, threads, or processes and may include stored data associated with the permissions module 1095. The permissions module 1095 may store data associated with permissions related to administrators, sites, and/or content. For example, the permissions module 1095 may store permissions related to which administrators can send a content update for a particular site, which sites a particular administrator can access, if an administrator can create a site, or which administrators can approve or deny the modification of content.

In embodiments, the permissions available may be to share content (i.e., edit and contribute to the content), read content (i.e., view and use the content), to copy the content, or to block other administrators from viewing or in any way using the content.

In embodiments in which content may be shared, read, or copied, two or more sites may share visualizations. In such embodiments, a user's progress on the two or more sites may be shown on one page, such a leaderboard.

In embodiments in which content may be shared or read, two or more sites may have co-mingled rewards. In such embodiments, two or more sites may award the same type of reward (e.g., points), and the rewards from the different sites may be used collectively to earn other rewards. For example, site 1 and site 2 both award points and those points can be used collectively to earn badges or to achieve a higher level.

In further embodiments in which content may be read, two or more sites may have the same type of rewards, but one site administrator may own awarding the reward. For example, site 1 and site 2 both award points and those points can be used collectively to earn badges or to achieve a higher level, however, only the site administrator who owns site 1 can create content to award points.

In embodiments in which content may be copied, two or more sites may have the same type of rewards, but the rewards may be considered separately. In such embodiments, two or more sites may award the same type of reward (e.g., points), but the rewards from the different sites may not be used collectively to earn other rewards. For example, site 1 and site 2 both award points, but the points from site 1 are used to earn badges and the points from site 2 are used to achieve a higher level.

In various embodiments, as described above, permission(s) may also be stored in administrator data 1094, the content module 1096, the content update engine 1097, and/or the site hosting module 1098. In such embodiments, the permissions module 1095 may receive a permission from administrator data 1094, the content module 1096, the content update engine 1097, and/or the site hosting module 1098 as a part of a request to perform an action. The permissions module 1095 may then compare the received permission to a permission level required to perform the requested action. If the permission provided is insufficient to perform the requested action, the permissions module 1095 may prevent the action from being performed.

In some embodiments, the permissions module 1095 may provide an indication of similar actions that may be taken which require a permission level that would be met with the provided permission. In such embodiments, the permissions module 1095, or the module or engine which sent the permission to the permissions module 1095 (e.g., the content update engine 1097), may provide the administrator with an option to perform one or more of the indicated similar actions. For example, if a site administrator sends a content update, the content update engine 1097 may provide the site administrator's permission related to the site to the permissions module 1095. If permissions related to the content are stored in the content module 1096, the permissions module 1095 may then request a permission level required from the content module 1096. The permissions module 1095 may compare the permission related to the site administrator to the permission level required by the content module 1096. If the permission related to the site administrator is insufficient to send a content update, but would be sufficient to create a copy of the content, which could then be updated, the permissions module 1095 may provide an indication that such an action could be taken.

In some embodiments, a content module 1096 that is programmed to be operated by the processor(s) 1092 may be present. The content module 1096 may comprise any number of sub-modules, applications, threads, or processes and may include stored data associated with the content module 1096. The content module 1096 stores the content created by administrators or other users. In various embodiments, the content module 1096 may also store permissions associated with the content, as described above. Content may include goals (e.g., watch a video, answer questions, sell an amount of a product, complete a homework assignment, run a distance, etc.), rewards (e.g., badges, points, levels, etc.), visualizations (e.g., the look and feel of the site, the look of the rewards, the information shown to the user about their progress or the progress of other users, etc.), and milestone logic (e.g., number of points required to achieve a level, number of points required to earn a badge, number of badges required to achieve a level, etc.).

In various embodiments, the content module 1096 contains a directory of content that can be queried by the site hosting module 1098 to ensure the proper content is being used. Further, in some embodiments, the content module 1096 can contain multiple versions of content (e.g. version 1.0, 1.1, 1.2, 1.1.1, etc.). In such embodiments, particular versions of content can be archived, for example, when a version is no longer in use because a new version is available.

In various embodiments, a content update engine 1097 is programmed to be operated by the processor(s) 1092 to regulate content updates. The content update engine 1097 interacts with the content module 1096 to integrate content updates provided by administrators and/or other users. For example, the content update engine 1097 can receive a content update from an administrator. The content update engine 1097 can then interact with the permissions module 1095 in order to determine if the administrator has the necessary permissions to update the requested content. If it is determined that the administrator has the necessary permissions, the content update engine 1097 can then interact with the content module 1096 to integrate the content update into the appropriate content.

In some embodiments, the content update engine 1097 can cause the content module 1096 to create a back-up copy of a version of content before an update is integrated. In further embodiments, the content update engine 1097 can determine that an administrator has requested a content update which another administrator has denied. In such embodiments, the content update engine 1097 can instruct the content module 1096 to create a copy of the version of the content currently in use, at which time the update can be integrated into the copy of the content to create a new version. The content update engine 1097 can also instruct the content module 1096 to update a content directory to indicate that the two sites are no longer using the same version of the content.

In some embodiments, the gamification site platform 1002 includes a site hosting module 1098 that is programmed to be operated by the processor(s) 1092 to host gamification sites. The site hosting module 1098 may comprise any number of sub-modules, applications, threads, or processes and may include stored data associated with the site hosting module 1098. The site hosting module 1098 can, for example, receive requests from an administrator to generate a new gamification site using content stored in the content module 1096. In such embodiments, the site hosting module 1098 can interact with the permissions module 1095 to determine if the administrator has permission to generate a gamification site using the requested content, as described above. If the administrator has the required permissions, the site hosting module 1098 can interact with the content module 1096 and update a content directory such that the generated site can access the requested content.

In embodiments, the site hosting module 1098 can receive requests to access a gamification site and can interact the permissions module 1095 to determine if the administrator has permission to access the site. In some embodiments, one or more permissions related to the gamification sites can be stored in the site hosting module 1098. The one or more permissions can be related to viewing a site, creating a site, and the like.

The numbering of the updates to the content in the examples contained herein may be construed as describing incremental versions of the content; distinguishing development state (i.e., alpha, beta, or release candidate, and release version); or any other specific numbering scheme commonly understood by one of skill in the art. The version numbering used throughout the disclosure should not be construed as referencing a single version numbering system.

Although the disclosure uses language that is specific to structural features and/or methodological acts, the invention is not limited to the specific features or acts described. Rather, the specific features and acts are disclosed as illustrative forms of implementing the invention.

We claim:

1. A computing system, comprising:
   one or more processors; and
   a memory coupled to the one or more processors, the memory storing computer-executable instructions that, when executed by the one or more processors, cause the one or more processors to:
   receive, from a first administrator device, a first request to generate a first gamification site from a first content, wherein the first content indicates at least a first permission;
   generate the first gamification site using the first content;
   receive, from a second administrator device, a second request to generate a second gamification site, the second request indicating at least to copy a portion of the first content to the second gamification site;
   determine, based at least on the first permission, whether a second administrator account associated with the second administrator device is authorized to copy the portion of the first content;
   generate, in response to determining that the second administrator account is authorized to copy the portion of the first content, the second gamification site using the portion of the first content;
   receive, from the second administrator device, a third request to update the first content;
   determine, based at least on the first permission, whether the second administrator account is authorized to update the first content; and
   transmit, at least in response to determining that the second administrator account is not authorized to update the first content, a notification to the second administrator device that the first content will not be updated.

2. The computing system of claim 1, wherein the computer-executable instructions, when executed by the one or more processors, further cause the one or more processors to:
   designate, in response to determining that the second administrator account is not authorized to update the first content, the first content in the second gamification site as a second content; and
   update, in response to designating the first content in the second gamification site as the second content, the second content based at least on the third request.

3. The computing system of claim 1, wherein the computer-executable instructions, when executed by the one or more processors, further cause the one or more processors to:
   receive, in response to transmitting the notification, another response from the second administrator device to designate the first content in the second gamification site as a second content;
   designate, at least in response the another request, the first content in the second gamification site as the second content; and
   update, in response to designating the first content in the second gamification site as the second content, the second content based at least on the third request.

4. The computing system of claim 1, wherein the computer-executable instructions, when executed by the one or more processors, further cause the one or more processors to:
   receive, from the first administrator device, a request to update the first content;
   determine, based at least on the first permission, whether a first administrator account is authorized to update the first content; and
   update the first gamification site, at least in response to determining that the first administrator account is authorized to update the first content.

5. The computing system of claim 4, wherein the computer-executable instructions, when executed by the one or more processors, further cause the one or more processors to:
   in response to updating the first gamification site, update the second gamification site.

6. A method comprising:
   receiving a first request to generate a first gamification site from a first content, wherein the first content indicates at least a first permission;
   generating the first gamification site using the first content;
   receiving, by a computing system associated with a first administrator account having the first permission and further associated with the first gamification site having the first content, a request from a second administrator account to copy the first content and to generate a second gamification site based on the first content;
   determining, by the computing system, based at least on the first permission, whether a second administrator account is authorized to copy the first content;
   generating, by the computing system, in response to determining that the second administrator account is authorized to copy the first content, the second gamification site using the first content;
   receiving, from the second administrator device, a third request to update the first content;
   determining, based at least on the first permission, whether the second administrator account is authorized to update the first content; and transmitting, at least in response to determining that the second administrator account is not authorized to update the first content, a notification to the second administrator device that the first content will not be updated.

7. The method of claim 6, further comprising:

receiving, by the computing system, a request from the first administrator account to update the first content to form a second content;

updating, by the computing system, in response to receiving the request to update the first content to form the second content, the first gamification site with the second content;

transmitting, by the computing system, a notification to the second administrator account to update the first content to the second content in the second gamification site and requesting a second permission to update the second gamification site;

receiving, by the computing system, a response from the second administrator account denying the second permission; and updating, by the computing system, the second gamification site with the second permission.

8. The method of claim 7, further comprising:

receiving, by the computing system, from the second administrator account, a request to update the first content to form a third content;

determining, by the computing system, based on the second permission, whether the second administrator account is authorized to update the first content; and transmitting in response to determining that the second administrator account is authorized to update the first content, a notification to the first administrator account that the first content will be updated to form the third content.

9. The method of claim 7, further comprising:

receiving from the first administrator account, by the computing system, a request to update the second content to a third content.

10. The method of claim 7, further comprising:

after receiving the request to update the first content to the second content and before the updating the first content to form the second content, determining, by the computing system, based on the first permission, whether the first administrator account is authorized to update the first content and updating the first content to form the second content responsive to determining that the first administrator account is authorized to update the first content.

11. The method of claim 6, further comprising:

receiving, by the computing system, a request from the first administrator account to update the first content to form a second content;

determining whether the first administrator account is authorized to update the first content; and updating, by the computing system, the second gamification site, in response to determining that the first administrator account is authorized to update the first content.

12. The method of claim 7, further comprising:

designating, by the computing system, in response to receiving the response from the second administrator account denying the second permission, the first content in the second gamification site as a third content.

* * * * *